(12) United States Patent
Garnier

(10) Patent No.: US 7,773,433 B2
(45) Date of Patent: Aug. 10, 2010

(54) METHOD FOR MANAGING A NON-VOLATILE MEMORY IN A SMART CARD

(75) Inventor: Thierry Garnier, Gemenos (FR)

(73) Assignee: Gemalto SA, Meudon (FR)

( * ) Notice: Subject to any disclaimer, the term of this patent is extended or adjusted under 35 U.S.C. 154(b) by 297 days.

(21) Appl. No.: 11/922,999

(22) PCT Filed: Jun. 15, 2006

(86) PCT No.: PCT/EP2006/063244

§ 371 (c)(1),
(2), (4) Date: Dec. 28, 2007

(87) PCT Pub. No.: WO2007/003493

PCT Pub. Date: Jan. 11, 2007

(65) Prior Publication Data

US 2009/0034333 A1    Feb. 5, 2009

(51) Int. Cl.
*G11C 7/00* (2006.01)
(52) U.S. Cl. ............... 365/189.2; 365/185.05
(58) Field of Classification Search ............ 365/189.2, 365/185.05
See application file for complete search history.

(56) References Cited

U.S. PATENT DOCUMENTS

| 5,418,752 | A | 5/1995 | Harari et al. |
| 5,606,529 | A | 2/1997 | Honma et al. |
| 5,860,083 | A | 1/1999 | Sukegawa |
| 2002/0083280 | A1 | 6/2002 | Naitoh et al. |
| 2002/0176282 | A1* | 11/2002 | Seki et al. ............... 365/185.22 |
| 2003/0137881 | A1* | 7/2003 | Sasaki ................... 365/189.09 |
| 2005/0185493 | A1* | 8/2005 | Fujioka et al. ......... 365/230.05 |

FOREIGN PATENT DOCUMENTS

EP    0 702 305 A1    3/1996

* cited by examiner

*Primary Examiner*—Tuan T. Nguyen
(74) *Attorney, Agent, or Firm*—Buchanan Ingersoll & Rooney PC

(57) ABSTRACT

A non-volatile memory of a first type, having characteristics of high capacity and coarse granularity, is associated with a non-volatile memory of a second type, having characteristics of low capacity and fine granularity. These memories are managed such that a non-volatile memory resulting from this association has the characteristics of high capacity of the first type of non-volatile memory and fine granularity of the second type of non-volatile memory.

20 Claims, 1 Drawing Sheet

METHOD FOR MANAGING A NON-VOLATILE MEMORY IN A SMART CARD

Figure 1:
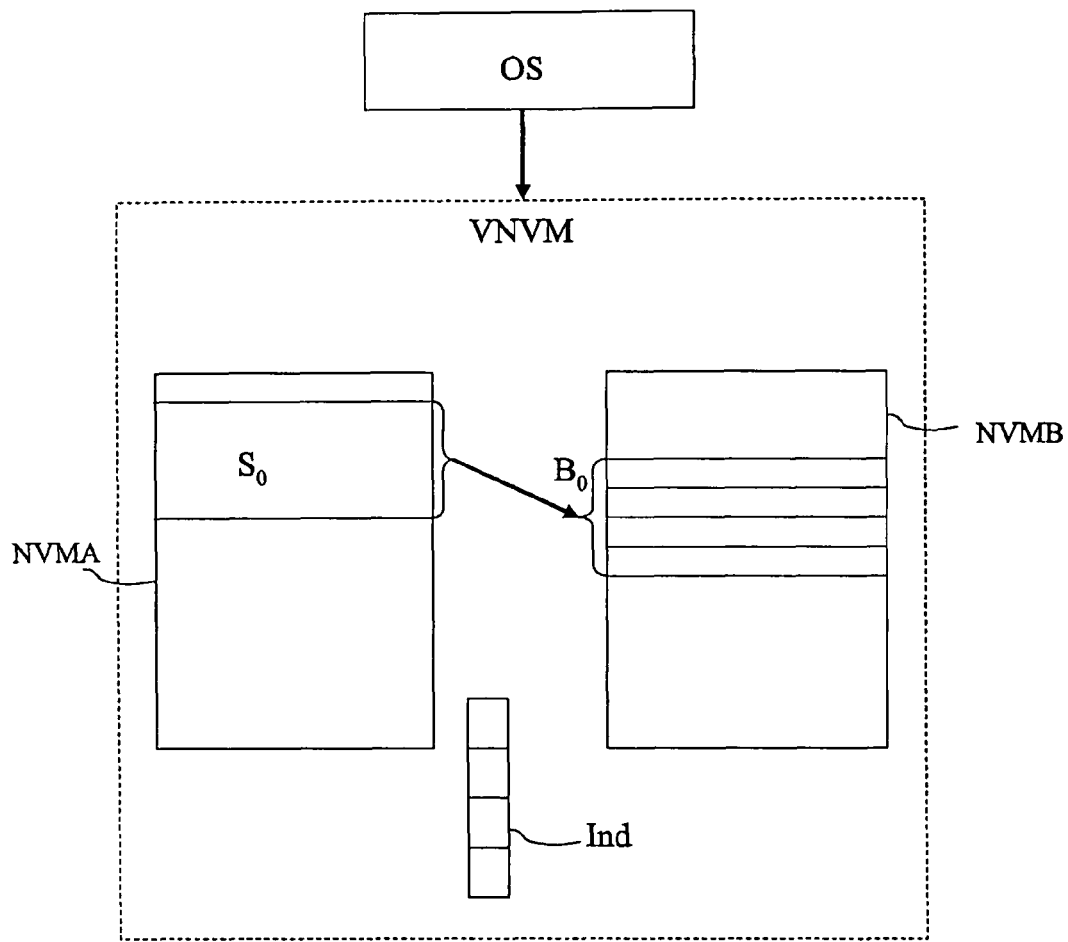

The present invention relates to the management of a non-volatile memory in embedded run environments and relates, in particular, to the management of memories of this type in a portable electronic device equipped with a microcontroller comprising a processor and volatile and non-volatile memories, such as a smart card, for example.

Currently, there is a growing trend for devices of this type to use high-capacity non-volatile memories, which today have a capacity of around one hundred kilobytes (kB), although future capacities of several megabytes (MB) are foreseeable.

However, high-capacity non-volatile memories, for example NAND or NOR-type Flash memories, although they benefit from generally high write speeds per bit, have a considerable disadvantage as regards use in the field of smart cards. This disadvantage relates to their granularity, which is far from fine. Typically, high-capacity non-volatile memories are deleted in blocks of 8 kB, 16 kB, 32 kB, or more, and can be read by 512-byte pages. Indeed, the greater the granularity, the less decoding to be carried out and the better the density in terms of memory integration.

In this way, the management of these memories must adapt to this low degree of fragmentation inherently associated with them, thereby complicating the use of high-capacity non-volatile memories in smart cards, where the modification of one byte, bearing in mind very strong constraints on the integrity aspect of the data that are specific to the embedded operating systems for smart cards, may require deleting, writing or moving consequent blocks of data.

Indeed, several operations are required in each phase of memory management in order to respect smart-card data integrity, for example when writing a piece of data. In this way, it is necessary to keep the old data until the new data has been written with certainty, so as to make sure that no data are lost in the event of a power failure, for example. This process, which therefore involves a greater number of operations on the memory than simply writing a piece of data, is foreseeable when the data in question is on one byte, for example, but not when the memory must be managed in 32 kB blocks, for example. The time required to perform several write operations of a 32 kB block then becomes unacceptable.

In order to get around these physical difficulties, semiconductor memory manufacturers are suggesting that operating-system suppliers modulate their offer so as to find various compromises between capacity, granularity of memory blocks and access speed. However, the same pattern remains, wherein high-capacity memories involve very large memory sectors, such as 16, 32 or 64 kB, which, as seen above, is particularly difficult to manage in the context of smart cards as regards data integrity and performance.

Furthermore, there are methods for speeding up access to high-capacity memories. Generally, these methods implement considerable RAM resources with the essential aim of increasing performance without any particular power consumption and data integrity constraints. In addition, RAM memories have no problem with granularity, since they have random byte access. These current solutions are not, however, compatible with the field covered by the present invention, which is that of smart cards. In fact, RAM memory is expensive, requires a lot of space and power and, moreover, does not guarantee data integrity, since it is a volatile memory.

The invention aims to resolve these disadvantages by providing a memory-management system which conforms to the characteristics demanded by latest-generation smart-card portable electronic devices, supporting the use of high-capacity non-volatile memories, while guaranteeing fine granularity of memory access which is compatible with the constraints relating to processing data integrity on smart cards, as well as good performance in terms of memory-access processing speed.

The invention therefore relates to a method of managing access to a non-volatile memory, characterised in that said non-volatile memory results from the association of a non-volatile memory of a first type comprising first characteristics of capacity and granularity, with a non-volatile memory of a second type comprising second characteristics of capacity and granularity, such that said non-volatile memory resulting from said association has the characteristics of capacity of said non-volatile memory of the first type and the characteristics of granularity of said non-volatile memory of the second type.

Advantageously, the access to at least one block of the non-volatile memory of the first type comprises the following steps consisting of:
moving said block at least partially to a portion of the non-volatile memory of the second type (NVMB), said memory of the second type acting as a permanent buffer for the memory of the first type,
performing all read and/or write operations on said block in said portion of the memory of the second type to which said block was moved.

According to one embodiment, when said block is accessed for writing, it also comprises a step of updating the data of said block in the location corresponding to said block in said memory of the first type.

According to this embodiment, the step of updating said block in the non-volatile memory of the first type consists of, in the background, deleting said block in the memory of the first type after it has been moved to the non-volatile memory of the second type and returning said block, if necessary, once the write operation has been performed, to the location corresponding to said moved block in the non-volatile memory of the first type.

In one variation, the data of said updated block is only returned to the non-volatile memory of the first type when the space taken up by this block in the non-volatile memory of the second type is required in order to move another block into it. Otherwise, the system can access the data of the virtual non-volatile memory by transparently adapting to the fact that these data are physically stored in the non-volatile memory of the first or second type.

According to one embodiment, the method advantageously includes returning one block of data already moved into the non-volatile memory of the second type to its corresponding location in the non-volatile memory of the first type before accessing at least one other block of the non-volatile memory of the first type.

The method advantageously includes storing at least one identifier in a persistent memory, provided to establish a link between each block moved from the non-volatile memory of the first type and the corresponding portion of the non-volatile memory of the second type. Preferably, a non-volatile memory of the first type comprising characteristics of high capacity and coarse granularity is associated with a non-volatile memory of the second type comprising characteristics of low capacity and fine granularity.

The invention further relates to a portable electronic device, equipped with data-processing means comprising a microprocessor and volatile and non-volatile memories, characterised in that the non-volatile memory results from the association of a non-volatile memory of a first type comprising first characteristics of capacity and granularity with a non-volatile memory of a second type comprising second characteristics of capacity and granularity, such that said non-volatile memory resulting from said association has the characteristics of capacity of said non-volatile memory of the first type and the characteristics of granularity of said non-volatile memory of the second type.

Preferably, the non-volatile memory of the first type comprises characteristics of high capacity and coarse granularity and the non-volatile memory of the second type comprises characteristics of low capacity and fine granularity.

According to one embodiment, the non-volatile memory of the first type is a NOR or NAND-type Flash memory.

According to one embodiment, the non-volatile memory of the second type is an EEPROM, FeRAM, MRAM, PCRAM memory or any type of random-access persistent memory.

Advantageously, the portable electronic device comprises means for implementing the method according to the invention.

Preferably, this device is a smart card.

Further characteristics and advantages of the present invention will appear more clearly from reading the following description provided as an illustrative example in a non-limiting manner and made in reference to the appended single FIGURE:

FIG. 1, depicting the virtual memory principle according to the invention based on matching a first non-volatile memory of a first type (high capacity, coarse granularity) with a second non-volatile memory of a second type (low capacity, fine granularity).

In reference to FIG. 1, the principle of the invention consist of associating two different types of non-volatile memories NVMA and NVMB, to form a so-called virtual non-volatile memory VNVM, having characteristics of capacity and granularity that take the best characteristics of the two matched memories.

In this way, from the point of view of the operating system OS, this association is perceived as a single memory responding to the characteristics demanded by the invention in terms of large memory capacity, fine granularity of memory access, data integrity processing, access processing speed, minimum volume and uniform memory access as regards different types of memory from different manufacturers, particularly advantageous for aspects of operating-system portability.

According to one example of embodiment, the characteristics of the two memories NVMA and NVMB to be associated are as follows.

The memory of the first type NVMA is a high-capacity non-volatile memory, typically from around several hundred kilobytes to several megabytes, with very high density of integration. This can be, for example, a NOR or NAND-type Flash memory. It has, in addition, a granularity classified as coarse-grained granularity. That is to say, the size of the memory block is around several dozen kB, for example 8 kB, 16 kB or 32 kB, the deletion time of a block is, for example, around 1.5 s, the size of one page of writing is around several hundred bytes (128/256/512 bytes) and the write time for one page ranges from several ps to several ms.

The memory of the second type NVMB is a low-capacity non-volatile memory, for example less than 200 kB, with a lower density of integration. It must therefore be chosen with the lowest possible capacity, such as 8, 16 or 32 kB. Such a memory has low complexity of data integrity management. It is, for example, an EEPROM ("Electrically Erasable Programmable Read-Only memory"), FeRAM ("Ferroelectric Random Access Memory"), MRAM ("Magnetic Random Access Memory") or PCRAM-type memory. It has, in addition, a granularity classified as fine granularity. That is to say, updates are performed in blocks of 1, 4 or 16 bytes in several hundred ns, for example, for a FeRAM-type memory, or several ms for an EEPROM-type memory. Furthermore, the size of a page of writing is around several dozen bytes (1/64/128 bytes).

In this way, from the point of view of the card operating system, the virtual non-volatile memory is viewed as a high-capacity memory such as defined by the memory of the first type NVMA, with characteristics of granularity and performance which are those associated with the memory of the second type NVMB.

Advantageously, all write operations on a piece of data always involve duplicating this piece of data on the two types of memory NVMA and NVMB before updating it. The integrity of this piece of data is therefore inherently guaranteed in the event of a power failure. In this way, all write operations with integrity on a piece of data of the NVMA, lead to an integrity operation usually carried out in the NVMB memory (low data volume & complexity). For example, the use of a FeRAM-type memory as NVMB makes it possible inherently to guarantee the integrity of the data of the NVMA, since the writing in the FeRAM is integral by nature.

For this purpose, the principle according to the present invention consists of mapping a complete block $S_0$ of the NVMA memory (high-capacity memory with coarse granularity) in the smaller NVMB memory with finer granularity, in the first write operation in the block $S_0$ in question of the NVMA memory. The size of the blocks to be mapped of the NVMA memory must obviously be smaller than the size of the NVMB memory. Where $B_0$ is the portion of the NVMB memory used to map the block $S_0$ of the NVMA memory. Once this block of the NVMA memory is moved (by copying it) into the NVMB memory, all subsequent reading (or writing) to be performed in this block in question of the NVMA memory, will be carried out in this NVMB memory block, memory which advantageously has low complexity for managing integral data updates.

The non-volatile memory NVMB therefore acts as a small buffer memory on the sides of the high-capacity non-volatile memory NVMA, thus making up for faults already identified in terms of granularity and speed of access, inherent in the use of high-capacity memory in smart cards. In addition, unlike a standard data buffer, the NVMB memory is a persistent memory, which is particularly advantageous as regards processing the data integrity.

The following rules therefore apply. Once the block $S_0$ is mapped in the NVMB memory (low capacity, fine granularity), all operations in this block are then performed in this NVMB memory. It should be noted that the process of mapping a complete block of the NVMA memory is very quick thanks to the characteristics of the quick non-volatile memory. For example, in the case of a FeRAM-type NVMB memory, 32 kB can be written in 3 ms. Once mapped in the NVMB memory, the block $S_0$ of the NVMA memory can be deleted in the background (long process of around 1.5 s) without therefore affecting the performance of the system. There are problems with data integrity, since the data of this block $S_0$ in NVMA are only deleted with the condition that the transfer is correctly performed. The initial block of the NVMA memory is then free to receive the future update.

Write operations are then performed in the mapped block $B_0$, with the finest granularity, the maximum flexibility (no need to work on a blank memory area), and at the maximum speed offered by the NVMB memory, thus minimising the efforts and complexity involved in managing data integrity.

For example, in the case of a FeRAM-type NVMB memory, writing is performed with a granularity of one byte at 100 ns/byte (including data integrity) as against almost several hundred ms (or even 1 s) for updating this byte in NVMA.

The management of this virtual memory, formed by associating the non-volatile memory NVMA (high-capacity, coarse granularity) with the non-volatile memory NVMB (low-capacity, fine granularity) is furthermore very easy, since it suffices in fact to store an identifier of the mapped block of the NVMA memory in an area of the persistent memory Ind dedicated for this purpose.

The identifier of the block mapped between the two types of memory must be stored in a persistent memory in order to guarantee data integrity, in particular in the event of a power failure. Advantageously, the memory area Ind can be stored in the NVMB memory. The identifier is thus provided to establish a link between the mapped block of the NVMA memory and the matching block in the NVMB memory.

According to one example of an embodiment, the identifier indicates the address or reference corresponding to the mapped block of the NVMA memory, as well as the validity of the information present in this indicator (is the reference provided by this indicator updated?).

When another block of the NVMA memory needs to be accessed for writing, the following operations are implemented. The data written in the NVMB memory must first be moved (by copying them) to the initially mapped block $S_0$ of NVMA, the reference of which is stored by the associated mapping identifier "Ind", this block having been previously freed up in the background as explained above. The block $S_0$ is therefore written at high speed since it is advantageously performed on a blank sector.

Then, according to the principles already explained, the new block of the NVMA memory is mapped in the NVMB memory, and the mapping indicator is updated (validity and reference of the mapped block). The new mapped block of the NVMA memory is then deleted in the background. In every case, the integrity of the data is inherently preserved, since the data are always, at any given time, present in at least one of the two non-volatile memories NVMA or NVMB. The re-mapping operation is quick and reliable without unnecessary complexity.

Let us take an example with a Flash-type NVMA memory, comprising the following characteristics: deletion of a 32 kB block: 1.5 s, writing of 512 bytes: 1 ms; and with a FeRAM-type NVMB memory, comprising the following characteristics: writing one byte: 100 ns.

According to this example, it takes 64 ms to move the data of a previously mapped 32 kB block from the NVMB memory to the NVMA memory (blank sector). The transfer of the data from the new mapped block of the NVMA memory to the NVMB memory takes 3 ms. The deletion of the mapped block in the NVMA memory takes 1.5 s, but this time is invisible to the user as a background task. The outcome is therefore less than 70 ms for switching from one work sector to another (data integrity guaranteed).

The operations to be considered for implementing the virtual non-volatile memory system according to the invention are therefore moving a block $S_i$ from the NVMA memory to be mapped to the NVMB memory, deleting, in the background, the block $S_i$ from the NVMA memory identified by the associated mapping identifier stored in the memory, and returning the data present in the NVMB memory to the location of the NVMA memory designated by the current value of the mapping identifier.

A write access phase triggers the following operations:

1) if a block $B_i$ of the NVMA memory considered by the write operation is already present in the NVMB memory, the write operation is carried out directly in the NVMB memory. To do this, a previous comparison is performed to see whether the block $B_i$ corresponds to an already mapped block, by analysing the current value of the mapping identifier.

2) If not, if the block $B_i$ considered by the current write operation is not present in the NVMB memory, the operation of placing the block $B_i$ in the NVMB memory is triggered by implementing the following operations a) if a block $B_j$ of the NVMA memory is already mapped in the NVMB memory, this block $B_j$ is previously returned to the NVMA memory;

b) the data of block $B_i$ are moved to the NVMB memory, and the mapping identifiers are updated;

c) the data of the block $B_j$ are deleted in the background from the NVMA memory d) the current operation on the data is performed in the NVMB memory.

Furthermore, a read access phase of the NVMA memory triggers the following operations:

e) if the block $B_i$ of the NVMA memory considered by the read operation is identified as being present in the NVMB memory, after comparing the reference corresponding to the block $B_i$ with the current value of the mapping identifier, the read operation is then carried out in the NVMB memory.

f) if not, if the block $B_i$ of the NVMA memory considered by the read operation is not already present in the NVMB memory, and the NVMA memory does not allow random access to the data, the read operation is performed in NVMB according to step 2) above;

g) if not, if the block $B_i$ of the NVMA memory considered by the read operation is not present in the NVMB memory, but the NVMA memory allows random access to the data, the read operation is performed directly in the NVMA memory.

As seen above, in that relating to NVMA memories that do not accept random read access, for example NAND-type Flash memories, it is advisable to move the block in question of the NVMA memory to the NVMB memory, which is then accessed not only for writing but also for reading.

It should, however, be noted that when a block of NAND-type Flash memory NVMA is accessed for reading only, it is not necessary to update this block in NVMA (or to delete or subsequently modify it). It is only when this previously mapped block is modified in NVMB that the deletion process of the block in the background and its subsequent update in NVMA actually take place.

The management of access to the virtual non-volatile memory such as described, based on mapping data in the non-volatile memory of the first type NVMA to the non-volatile memory of the second type NVMB, is preferably carried out in software.

The present invention has numerous advantages. First of all, it can be implemented by adapting to the type of granularity of the high-capacity non-volatile memory NVMA chosen. The granularity of these memories in the context of smart cards is therefore no longer a problem since it is concealed by using the persistent buffer made up of the low-capacity, fine granularity non-volatile memory NVMB in association with these memories.

Furthermore, the architectural differences between Flash memories are also mostly concealed from the card operating system, providing better operating system portability and fewer constraints when choosing memory suppliers.

The best NVMA/NVMB couple also makes it possible to reduce the capacity requirements of the NVMB-type non-volatile memory, which is more expensive, in the benefit of the NVMA-type non-volatile memory, which can therefore be used for more applications thanks to the advantages explained above.

This type of association therefore has the essential advantage of benefiting from the advantages of two types of non-volatile memory, low-capacity/fine granularity and high-capacity/coarse granularity, without suffering the disadvantages, in a unified model, while overcoming the complex problem of effectively managing the processing of data integrity.

According to one embodiment, rather than mapping one block at a time from the NVMA memory to the NVMB memory, it can be preferable to map several blocks at once, in order to optimise the various operations of placing/replacing data in the memory. However, the basic operation as already explained remains the same. For example, for an NVMB-type memory, a capacity of 64 kB, considered to be low, makes it possible, for example, to map three 16 kB sectors while keeping 16 kB free for another use.

According to another embodiment, it is possible to consider only partially mapping the data blocks in question, thus providing a broader addressing field. However, this embodiment increases the complexity relating to the management of mapped information.

The invention claimed is:

1. Method of managing access to a non-volatile memory, wherein said non-volatile memory results from the association of a non-volatile memory of a first type comprising characteristics of high capacity and coarse granularity, with a non-volatile memory of a second type comprising characteristics of low capacity and fine granularity, such that said non-volatile memory resulting from said association has the characteristics of capacity of said non-volatile memory of the first type and the characteristics of granularity of said non-volatile memory of the second type.

2. Method according to claim 1, wherein the access to at least one block of the non-volatile memory of the first type comprises the following steps comprising moving said block at least partially to a portion of the non-volatile memory of the second type, said memory of the second type acting as a permanent buffer for the memory of the first type, performing all read and/or write operations on said block in said portion of the memory of the second type to which said block was moved.

3. Method according to claim 2, wherein, when said block is accessed for writing, further comprising a step of updating the data of said block in the location corresponding to said block in said memory of the first type.

4. Method according to claim 3, wherein the step of updating said block in the non-volatile memory of the first type comprises deleting, in the background, said block in the memory of the first type after it has been moved to the non-volatile memory of the second type and of returning said block, once the write operation has been performed, to the location corresponding to said moved block in the non-volatile memory of the first type.

5. Method according to claim 2, further including returning one block of data already moved into the non-volatile memory of the second type to its corresponding location in the non-volatile memory of the first type before accessing at least one other block of the non-volatile memory of the first type.

6. Method according to claim 2, further including storing at least one identifier in a persistent memory, provided to establish a link between each block moved from the non-volatile memory of the first type and the corresponding portion of the non-volatile memory of the second type.

7. Method according to claim 3, further including returning one block of data already moved into the non-volatile memory of the second type to its corresponding location in the non-volatile memory of the first type before accessing at least one other block of the non-volatile memory of the first type.

8. Method according to claim 4, further including returning one block of data already moved into the non-volatile memory of the second type to its corresponding location in the non-volatile memory of the first type before accessing at least one other block of the non-volatile memory of the first type.

9. Method according to claim 3, further including storing at least one identifier in a persistent memory, provided to establish a link between each block moved from the non-volatile memory of the first type and the corresponding portion of the non-volatile memory of the second type.

10. Method according to claim 4, further including storing at least one identifier in a persistent memory, provided to establish a link between each block moved from the non-volatile memory of the first type and the corresponding portion of the non-volatile memory of the second type.

11. Method according to claim 5, further including storing at least one identifier in a persistent memory, provided to establish a link between each block moved from the non-volatile memory of the first type and the corresponding portion of the non-volatile memory of the second type.

12. Portable electronic device, equipped with data-processing means comprising a microprocessor and volatile and non-volatile memories, wherein the non-volatile memory results from the association of a non-volatile memory of a first type comprising characteristics of high capacity and coarse granularity with a non-volatile memory of a second type comprising characteristics of low capacity and fine granularity, such that said non-volatile memory resulting from said association has the characteristics of capacity of said non-volatile memory of the first type and the characteristics of granularity of said non-volatile memory of the second type.

13. Portable electronic device according to claim 12, wherein the non-volatile memory of the first type is a NOR or NAND-type Flash memory.

14. Portable electronic device according to claim 12, wherein the non-volatile memory of the second type is an EEPROM, FeRAM, MRAM, PCRAM memory or any type of random-access persistent memory.

15. Portable electronic device according to claim 12, further comprising means for implementing the following operations:

moving a block of the non-volatile memory of the first type at least partially to a portion of the non-volatile memory of the second type, said memory of the second type acting as a permanent buffer for the memory of the first type, and performing all read and/or write operations on said block in said portion of the memory of the second type to which said block was moved.

16. Portable electronic device according to claim 12, said device is a smart card.

17. Portable electronic device according to claim 13, wherein the non-volatile memory of the second type is an EEPROM, FeRAM, MRAM, PCRAM memory or any type of random-access persistent memory.

18. Portable electronic device according to claim 13, wherein said device is a smart card.

19. The portable electronic device according to claim 12, wherein each of said first type of memory and said second type of memory comprises a semiconductor memory.

20. The method according to claim 1, wherein each of said first type of memory and said second type of memory comprises a semiconductor memory.

* * * * *